Dec. 13, 1938.   C. R. BOSTWICK   2,140,069
TRIPLICATE FOLDING HAND MIRROR
Original Filed Feb. 5, 1936
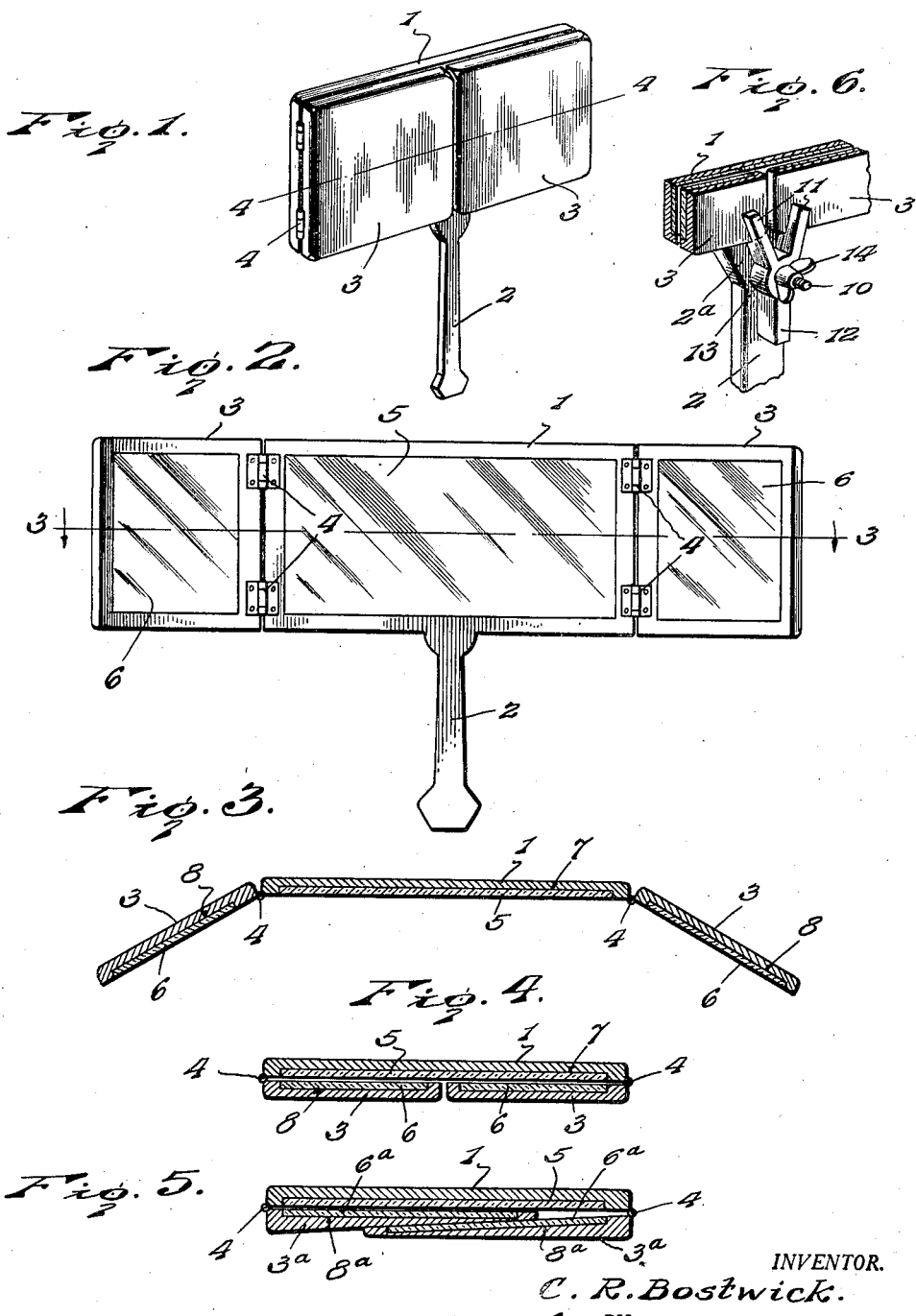
INVENTOR.
C. R. Bostwick.
BY
Lacey & Lacey, ATTORNEYS.

Patented Dec. 13, 1938

2,140,069

UNITED STATES PATENT OFFICE 2,140,069

TRIPLICATE FOLDING HAND MIRROR

Cyrus R. Bostwick, Cato, N. Y.

Application February 5, 1936, Serial No. 62,518
Renewed June 28, 1938

1 Claim. (Cl. 88—89)

This invention relates to a mirror and more particularly to a hand mirror and one object of the invention is to provide a mirror which is so constructed that it may be held by its handle when in use, portions of the mirror being adjustably mounted in order that they may be moved to such positions relative to each other and to the main section of the mirror that persons holding the mirror may view themselves from various angles and also see the back of the head and thus permit a woman to properly comb and arrange her hair.

Another object of the invention is to so form the mirror that the adjustable sections will be hingedly mounted at opposite ends of the main section so that they may be disposed either in an extended position for use or in a folded position in which they fit flat against the main section in covering relation thereto with their free ends meeting midway the ends of the main section directly over the handle. It will thus be seen that the mirror when not in use may be reduced to a compact mass and may be placed upon a dressing table.

Another object of the invention is to so form the mirror that the adjustably mounted sections may be easily moved from a folded to an extended position, the adjustable sections being of such dimensions that they will not be liable to swing out of an adjusted position during use of the mirror.

The invention is illustrated in the accompanying drawing, wherein

Figure 1 is a perspective view showing the mirror folded.

Figure 2 is a view of the mirror with the adjustable sections in an extended position.

Figure 3 is a sectional view taken along the line 3—3 of Figure 2.

Figure 4 is a sectional view taken along the line 4—4 of Figure 1.

Figure 5 is a view similar to Figure 4 illustrating a modified construction.

Figure 6 is a perspective view showing another modified construction.

This improved mirror consists, briefly, of a main section 1 carrying a depending handle 2 midway its ends and auxiliary sections 3 which are pivotally mounted at ends of the main section by hinges 4 in order that the auxiliary sections may be swung from a folded position in which they are disposed flat against the main section, as shown in Figures 1 and 4, to an extended position in which they are disposed in desired angular relation to the main section, as clearly shown in Figures 2 and 3. These auxiliary sections may be disposed in end to end alinement with the main section when extended, or at any predetermined angle between the fully extended position and the folded position in which they rest flat against the main section. Attention is called to the fact that each of the auxiliary sections is substantially one-half the length of the main section and, therefore, when the auxiliary sections are swung to closed position they may rest flat against the main section with their free ends meeting midway the length thereof and directly above the handle 2. This causes the mirror to be reduced to a compact mass in which the reflecting glasses 5 and 6 of the main section and auxiliary sections will be shielded and prevented from likelihood of being broken when the mirror is set upon a dressing table. By having the auxiliary sections approximately one-half the width of the main section, they may be grasped by their free end portions and easily swung to an extended position but they will not have sufficient leverage to cause their weight to move them out of a set position and, therefore, the mirror may be held by its handle with one hand and the other hand used to comb or otherwise arrange the hair without the auxiliary mirrors moving from a set position and preventing a desired view from being obtained. The frames of the main section and auxiliary sections may be formed of wood, metal, or a desired composition such as hard rubber or any other desired material and recesses 7 and 8 are formed in the main section and auxiliary sections to snugly receive the reflecting glasses 5 and 6. Therefore, these glasses will be countersunk with their outer faces flush with marginal portions of the frames, as clearly shown in Figures 3 and 4 and the auxiliary sections may be moved to a fully closed position without likelihood of the glasses being broken or cracked due to contact with each other.

In Figure 5 there has been shown a modified construction wherein the auxiliary sections 3ᵃ of the mirror are of greater width than the sections 3 and one is disposed in overlying relation to the other when these auxiliary sections are in the folded position. It should also be noted that the frames of the auxiliary sections 3ᵃ are gradually reduced in thickness from their pivoted ends towards their free ends so that when the two auxiliary sections are in the folded position shown in Figure 5, the combined thicknesses of the section 1 and the overlapping portions of the sections 3ᵃ will be no greater than in the embodiment shown in Figure 4 and the mirror will be very compact when folded. The reflecting glasses 6ᵃ are of the same thickness as the glasses 6 and mounted in seats 8ᵃ corresponding to the seats 8.

In the embodiment of the invention illustrated in Figure 1, the auxiliary mirrors may be held in a closed position during removal of the mirror from a dressing table by a person placing a thumb over the meeting lower corner portions of the auxiliary mirrors. In Figure 6, there has been shown a latch for releasably holding the auxiliary mirrors in the closed position. This latch is carried by a threaded stem 10 projecting from the widened upper portion 2ᵃ of the handle and has mirror engaging arms 11 and an actuating arm 12. The arms 11 diverge upwardly from the hub 13 of the latch through which the stem 10 extends and the arm 12 extends downwardly from the hub longitudinally of the handle in overlying relation thereto so that it may be easily engaged by the thumb of a hand grasping the handle 2 to swing the latch to a position in which the arms 11 will be moved from overlying engagement with the auxiliary mirrors and these mirrors released. A winged nut 14 carried by the stem holds the latch in place and may be tightened to resist turning of the latch.

Having thus described the invention, what is claimed as new is:

A mirror comprising a main section, auxiliary sections pivotally mounted at opposite ends of the main section for swinging movement from an extended position to a folded position in covering relation to the main section, a handle depending from the main section midway the ends thereof, said auxiliary sections having their free ends meeting in abutting relation to each other over the handle when folded, a stem projecting forwardly from the upper portion of said handle at substantially right angles to the front face of the handle, a latch rotatably mounted upon said stem and having an upper portion for engaging over lower corner portions of the auxiliary sections when folded and a lower actuating arm extending longitudinally of the handle, and a fastener for said latch threaded upon said stem.

CYRUS R. BOSTWICK.